United States Patent Office 3,679,605
Patented July 25, 1972

3,679,605
EXTRUDED ALUMINA CATALYST SUPPORT AND
THE PREPARATION THEREOF
Robert A. Sanford, Prospect, Ky., and John Mooi, Homewood, and Edward S. Rogers, Hinsdale, Ill., assignors to Sinclair Research, Inc., New York, N.Y.
No Drawing. Continuation of application Ser. No. 725,218, Apr. 29, 1968. This application July 17, 1970, Ser. No. 56,000
Int. Cl. B01j 11/06
U.S. Cl. 252—463
16 Claims

ABSTRACT OF THE DISCLOSURE

A method of preparing extruded, gel-type alumina catalyst supports is disclosed. The method involves mixing crystalline alumina hydrate and about 2 to about 25 parts by weight of finely divided, low density polyethylene per 100 parts of alumina and an extrudable amount of water, extruding the mixture and calcining the mixture in a molecular oxygen-containing gas to substantially burn away the polyethylene and form a support. Additionally about 0.5 to 3 weight percent of starch and/or methyl cellulose may be included in the mixture prior to extrusion and calcination. These latter materials are also burned out of the support during the calcination.

---

This application is a continuation of application Ser. No. 725,218 filed Apr. 29, 1968, now abandoned.

This invention relates to the preparation of extruded, gel-type alumina catalyst supports suitable for use in, for instance, catalytic conversion processes employing elevated temperatures, and particularly to a method of preparing extruded alumina solid catalyst supports from a hydrous alumina which are characterized by a high degree of porosity while maintaining satisfactory bulk density, surface area and crush strength.

In shaping porous catalyst supports from metal oxides, for example, by pelleting or extruding a bimodal pore system frequently results. The pores are characterized as gel pores about 100 A. or less in size, resulting from packing of the ultimate gel particles, and feeder pores which are macropores somewhat smaller than the aggregates of gel particles compressed together to comprise the macro catalyst particle.

The need for catalyst feeder pores to permit rapid diffusion of reactants and products to and from the catalyst surface is well known, and much work has gone into the tailoring of feeder pore systems to specific reactions. For example, U.S. Pat. No. 3,147,208 to Johnson discloses that pores of 7,000 to 10,000 A. size are optimum for the hydrofining or hydrocracking of residual petroleum fractions, and discloses a method of forming a tabletted catalyst having this structure.

A particular problem associated with the extrusion of crystalline alumina monohydrate (e.g., boehmite) is the adverse effect on macroporosity due to the presence of the water necessary for the extrusion process. Thus, it has been found that water adversely affects the feeder pore radius and the feeder pore volume during the extrusion process. This result is in contrast to a tabletting process in the absence of water wherein macroporosity, feeder pore radius and feeder pore volume are satisfactorily maintained.

Carbon compounds heretofore have been used in the preparation of catalysts to provide a specific property. However, an additional problem associated with the use of any additive is that such use should not adversely affect the properties of the catalyst. While an improvement in a property may be gained in such a manner, the improvements often do not offset the resulting loss in, for example, crush strength and bulk density. Furthermore, the carbon compound often renders the catalyst mass extremely difficult to extrude. Accordingly, any advantages may not be particularly realized.

It has now been found that an extruded catalyst support wherein the feeder pore volume and radius are greatly increased while still maintaining a satisfactory bulk density and crush strength are prepared by a method which comprises mixing, in any order, primarily crystalline alumina monohydrate, from about 0.1 to 25 parts by weight of finely divided low density polyethylene per 100 parts of alumina and an extrudable amount of water, extruding said mixture to particle form and calcining said particles in a molecular oxygen-containing gas to substantially remove said polyethylene and form an active alumina support. More particularly, it has been found that an improved process for extruding boehmite is accomplished when low density polyethylene is admixed with the crystalline hydrous alumina in the presence of water whereby such mixture is extruded and calcined.

The addition of about 0.5 to 3 weight percent each of starch, methyl cellulose, or other extrusion aids is optional and can be effected, for instance, at the same time as the addition of the polyethylene. Such aids increase extrudability at higher water contents and are burned out during calcining along with the polyethylene. While it is possible to add the pore-forming materials before the gellation of the crystalline oxide has occurred, we prefer to add it afterwards.

The method involves mixing 100 parts by weight of crystalline, primarily monohydrate, hydrous alumina of a crystal size of about 10 to 150 A., preferably about 20 to 80 A., with a sufficient amount of water to form an extrudable mixture, for instance, about 10 to about 200, preferably about 25 to about 150 parts by weight free water, and about 2 to 25, preferably about 5 to 15, parts by weight of solid polyethyelne having a density of about 0.91 to 0.94, preferably about 0.912 to 0.925 g./cc., and a particle size of less than about 100 microns, preferably less than about 20 microns based upon hydrous alumina (dry basis). The parts by weight water is the amount of free water which is present in the dough mixture during the extrusion and which is present in an amount sufficient to provide a proper consistency for the formation of firm particles. The free water is water which can be removed by heating at atmospheric pressure in the range of from about 220° F. to about 250° F. The mixture is extruded and calcined in a molecular oxygen-containing gas atmosphere, e.g. at about 900 to 1200° F. The addition of the desired amounts of starch and methyl cellulose, e.g. about 0.5 to 3, preferably about 1 to 2 weight percent (basis oven dried boehmite powder) can be effected at the same time as the addition of the polyethylene powder. Calcination burns these organic materials from the catalyst support. The extrusion of the catalyst mixture is accomplished using conventional extrusion equipment.

The following non-limiting examples show the results of this method.

EXAMPLE I

An alumina, shown by X-ray diffraction to be 65% boehmite alumina monohydrate of 32 A. crystal size, 18% alumina trihydrate and the balance amorphous alumina was mixed with 1% each of starch and methyl cellulose extrusion aids in a dough mixer. Deionized water was added to form an extrudable dough, which was extruded through a die plate with 1/16 inch diameter holes using a worm-type laboratory extruder. The extrudable dough had a water content of 47.3 weight percent. The extrusion proceeded at a moderate rate. The product was dried and calcined in air for three hours at 1050° F. The results are shown as catalyst 17186 in the following table.

EXAMPLE II

One hundred parts of the alumina powder of Example I was mixed with 10 parts of a commercially available polyethylene powder of 2 to 10 micron particle size, and density of 0.915 g./cc. and 1 part each of starch and methyl cellulose. Water was added as in Example I, and the dough extruded, the extrusion proceeding rapidly. The dough had a water content of 44.8 weight percent. The product was dried and calcined in air for 3 hours at 1050° F., and is shown as catalyst 17187 in the following table.

EXAMPLE III

One hundred parts of the alumina powder of Example I was slurried in 1000 parts of deionized water. Ten parts of the polyethylene powder of Example II was added, and the mass stirred for one minute with a high speed stirrer. The mix was oven dried, and then extruded and calcined in air as described in Example I, the extrusion proceeding rapidly. The extrudable dough mixture had a water content of 50.7 weight percent. The product is shown as catalyst 17191 in the following table.

EXAMPLE IV

One hundred parts of the alumina of Example I was slurried with 1500 parts of deionized water, and ten parts of filter paper pulp (cellulose fiber) was added. The mass was mixed at high speed for two hours, then dried and extruded with 1 part each of starch and methyl cellulose as described in Example III. The extrusion was slow, it being necessary to remove the die plate once during the extrusion of about 500 g. of product to clean off the accumulation of cellulose fiber. The extrudable dough had a water content of 56.5 weight percent. Catalyst 17321 in the table is this material after drying and calcining in air.

EXAMPLE V

Another catalyst support was made from alumina powder, which was shown by X-ray diffraction to consist of boehmite alumina monohydrate of 60 A. crystal size, following the procedure of Example I. The extrudable dough had a water content of 53 weight percent. The calcined extrudate is being shown as 1049 in the table.

EXAMPLE VI

Ten parts of filter paper pulp were dispersed in 240 parts of deionized water by mixing at high speed for two hours. After removing 90 parts of water by filtration, the balance was blended with 100 parts of the alumina of Example V and 1 part each of starch and methyl cellulose to form an extrudable dough (44.8 weight percent water); this mixture was extruded as before. As in Example IV, the cellulose fiber obstructed the dies, and the plate had to be removed for cleaning three times during the extrusion of about 1000 g. of alumina. The product was dried and calcined in air for three hours at 1050° F., and is shown as catalyst 1381 in the following table.

EXAMPLE VII

A platinum on alumina (crystalline boehmite, 0.35 weight percent platinum) which was prepared by treatment of boehmite with chloroplatinic acid was ground with a hand mill to pass a 20 mesh screen and admixed with 2% powdered vegetable stearine. The platinum-alumina catalyst was tabletted (⅛″ diameter by ⅟₁₆″ length) to a 7 to 10 pound crush strength. A 200 gram portion of the tablets was calcined in air at a temperature of 900° F. The physical properties are given in the following table as catalyst 1317.

EXAMPLE VIII

Utilizing a platinum-alumina catalyst as described in Example VII, 815 grams of this material was mixed with 700 ml. of water to form an extruded dough. The mixture was extruded through a ⅟₁₆″ die plate and ⅜″ lengths of extrudate were recovered. A 200 gram portion was calcined for 3 hours at 1000° F. in dry air at atmospheric pressure. The physical properties are shown in the following table and identified as catalyst 1306.

TABLE I

| Catalyst | 17186 | 17187 | 17191 | 17321 | 1049 | 1381 | 1317 | 1306 |
|---|---|---|---|---|---|---|---|---|
| Surface area,[1] m.²/g | 253 | 253 | 266 | 271 | 203 | 220 | 339 | 305 |
| Total pore volume,[2] cc./g | 0.86 | 0.88 | 0.92 | 0.86 | 0.77 | 0.70 | 107 | .76 |
| Feeder pore radius,[3] A | Small | 2,100 | 3,200 | 800 | Small | 20,000 | 100–1,500 | |
| Feeder pore volume,[3] cc./g | | 0.18 | 0.13 | 0.085 | | 0.09 | 0.19 | 0 |
| Bulk density,[4] g./cc | 0.50 | 0.52 | 0.50 | 0.46 | 0.54 | 0.50 | | |
| Volume-density factor[5] | 0.430 | 0.458 | 0.460 | 0.396 | 0.400 | 0.350 | | |
| Crush strength,[6] lbs | 12.9 | 11.0 | 11.7 | 10.4 | 9.9 | 4.6 | 15.0 | 8.0 |

[1] BET nitrogen adsorption method.
[2] Helium-mercury porosimeter.
[3] Mercury porosimeter—modal pore radius shown.
[4] Determined by settling to minimum volume in a 1″ I.D. graduated cylinder.
[5] Product of total pore volume and bulk density.
[6] Average of 20 pcs., ¼″ length, crushed between parallel flat plates.

The results set forth in the preceding table demonstrate the improvement in an extruded porous catalyst support of the present invention. More particularly, a comparison of Examples II and III, the process and catalyst of this invention and VII and VIII, a tabletting and extrusion process in the absence of low density polyethylene, demonstrate the effect of water on hydrous alumina and, more particularly, the destruction of macroporosity and feeder pore volume in the presence of water. Thus a tabletting process provided a tabletted catalyst with a satisfactory feeder pore radius and feeder pore volume, whereas the corresponding extrusion process showed unsatisfactory properties. These results were in sharp contrast with the extrusion process of this invention wherein the presence of polyethylene in the process provides an extruded catalyst which has satisfactory feeder pore volume and feeder pore radius. In addition, the addition of the organic filler is accomplished without any special mixing and the particles so added, being of 2 to 10 microns in diameter (20,000 to 100,000 A.), form feeder pores of a particular desirable size range about ⅟₁₀ of the size of the added particles, i.e., 1000 to 5000 A. radius. In addition, 10% by weight of the polyethylene filler creates feeder pores comprising greater than 10% and even up to about 20% of the total pore volume of the catalyst base. Also, the addition of the plastic filler increases the feeder pore volume of the catalyst material, but does so without loss of catalyst bulk density, showing the high efficiency of the compression applied during the extrusion. This, in combination with the ease of extrusion, shows that the polyethylene powder has value as an extrusion aid.

In contrast, the filler of cellulose fibers (1) requires extensive mixing, and may produce a wide variety of feeder pore sizes (possible variations covering a 30-fold range); (2) produces feeder pores comprising only about 10% of the catalyst total pore volume for a 10% by weight addition of filler; and (3) decreases the bulk density of the catalyst base, often with an attendant significant decrease in crush strength. Cellulose fiber decreases the efficiency of the compression applied and leads to low density solids.

While this invention has been described with respect to various specific examples and embodiments, it is to be understood that the invention is not limited thereto and that it can be variously practiced within the scope of the following claims.

It is claimed:

1. A method of forming porous, active, extruded particles comprising mixing hydrous alumina which is primarily composed of alumina monohydrate having a crystalline size of about 10 to 150 A., about 2 to 25 parts, based on 100 parts of said hydrous alumina on a dry basis of solid polyethylene having a particle size less than about 100 microns and a density of about 0.91 to 0.94 gm./cc., and enough water to form an extrudable mixture, extruding said mixture to particle form and calcining said particles in a molecular oxygen-containing gas to substantially remove said polyethylene and form an active alumina support.

2. The method of claim 1 wherein the polyethylene particle size is less than about 20 microns.

3. The method of claim 1 wherein the water constitutes about 10 to about 200 parts by weight per 100 parts of said hydrous alumina on a dry basis.

4. The method of claim 3 wherein the water content is about 25 to about 150 parts by weight per 100 parts of said hydrous alumina on a dry basis.

5. The method of claim 1 containing the added step of providing in said mixture prior to extrusion, about 0.5 to 3 weight percent each of methyl cellulose and starch based on said hydrous alumina on a dry basis.

6. The method of claim 1 wherein said polyethylene comprises about 5 to 15 parts based on said 100 parts hydrous alumina on a dry basis.

7. The method of claim 6 wherein said alumina hydrate crystalline size is about 20 to 80 A. and the particle size of the polyethylene is less than about 20 microns.

8. The method of claim 7 wherein said polyethylene has a density of about 0.912 to 0.925 gm./cc.

9. The method of claim 8 wherein the water content is about 50 to about 1500 parts by weight per 100 parts of said hydrous alumina on a dry basis.

10. The method of claim 9 containing the added step of providing in said mixture, prior to extrusion, about 0.5 to 3 weight percent each of methyl cellulose and starch based on said hydrous alumina on a dry basis.

11. The extruded, porous, active alumina particle made by the method of claim 1.

12. The extruded, porous, active alumina particle made by the method of claim 2.

13. The extruded, porous, active alumina particle made by the method of claim 4.

14. The extruded, porous, active alumina particle made by the method of clam 5.

15. The extruded, porous, actve alumina particle made by the method of claim 7.

16. The extruded, porous, active alumina particle made by the method of claim 10.

References Cited

UNITED STATES PATENTS

| | | | |
|---|---|---|---|
| 3,051,662 | 8/1962 | Pitzer et al. | 252—430 |
| 2,697,066 | 12/1954 | Sieg | 252—461 X |
| 2,840,618 | 6/1958 | Hecht | 252—477 X |
| 2,930,762 | 3/1960 | Schoenenberger | 252—430 |

DANIEL E. WYMAN, Primary Examiner

W. J. SHINE, Assistant Examiner

U.S. Cl. X.R.

252—477 R

PO-1050
(5/69)

UNITED STATES PATENT OFFICE
CERTIFICATE OF CORRECTION

Patent No. 3,679,605            Dated July 25, 1972

Inventor(s) Robert A. Sanford, John Mooi and Edward S. Rogers

It is certified that error appears in the above-identified patent and that said Letters Patent are hereby corrected as shown below:

Column 1, line 6; delete "Sinclair Research, Inc., and insert in place thereof --- Atlantic Richfield Company---.

Column 6, line 19; delete "clam" and insert in place thereof ---claim---.

Column 6, line 20; delete "actve" and insert in place thereof ---active---.

Signed and sealed this 12th day of March 1974.

(SEAL)
Attest:

EDWARD M. FLETCHER, JR.
Attesting Officer

C. MARSHALL DANN
Commissioner of Patents